(12) United States Patent
Asselin et al.

(10) Patent No.: US 6,192,665 B1
(45) Date of Patent: Feb. 27, 2001

(54) SELF-POWERED BRUSH CUTTER

(75) Inventors: Jean-Guy Asselin, Charlesbourg; Raymond Fortier, L'Ange-Gardien, both of (CA)

(73) Assignee: Sylfor Inc., Charlebourg (CA)

( * ) Notice: Subject to any disclaimer, the term of this patent is extended or adjusted under 35 U.S.C. 154(b) by 0 days.

(21) Appl. No.: 09/272,567

(22) Filed: Mar. 19, 1999

(51) Int. Cl.⁷ .......................... A01D 34/04; A01D 75/10
(52) U.S. Cl. .................. 56/16.9; 56/12.1; 56/14.7
(58) Field of Search .................... 56/14.7, 255, 295, 56/12.1, 13.5, 14.9, 15.6, 16.7, 16.9, 235; 37/302; 414/543

(56) References Cited

U.S. PATENT DOCUMENTS

| | | |
|---|---|---|
| 3,136,107 | * 6/1964 | Spear ............................ 56/12.2 |
| 3,588,179 | * 6/1971 | Gifford .......................... 406/40 |
| 3,653,193 | * 4/1972 | Coughran, Jr. ................. 56/10.7 |
| 3,949,539 | 4/1976 | Cartner . |
| 4,196,571 | * 4/1980 | Goff .............................. 56/328.1 |
| 4,241,565 | * 12/1980 | Parsons, Jr. .................. 56/10.7 |
| 4,502,269 | 3/1985 | Cartner . |
| 4,869,056 | 9/1989 | Lynch . |
| 4,899,522 | 2/1990 | Munger . |
| 4,946,488 | 8/1990 | Davison . |
| 4,953,666 | 9/1990 | Ridings . |
| 4,996,830 | 3/1991 | Davison . |
| 5,016,731 | 5/1991 | Holmes . |
| 5,210,997 | 5/1993 | Mountcastle, Jr. . |
| 5,337,854 | 8/1994 | Brandt . |
| 5,775,075 | 7/1998 | Dannar . |
| 6,014,853 | * 1/2000 | Gregory, Sr. et al. ......... 56/27.5 |

FOREIGN PATENT DOCUMENTS 2066291  4/1992  (CA) .

* cited by examiner

Primary Examiner—Thomas B. Will
Assistant Examiner—Meredith C. Petravick
(74) Attorney, Agent, or Firm—Goudreau Gage Dubuc (57) ABSTRACT

A self-powered brush cutter provided with a carrier having motorized ground engaging elements mounted via tandem arms, an articulated boom and a cutter head attachment. The articulated boom includes an angular adjustment mechanism to adjust the angle of the cutter head attachment and to maintain this angle. The cutter head attachment includes a rotary blade and blade guards partially enclosing the plade and provided with apertures that are so configured as to allow the passage of a potentially damage blade.

24 Claims, 8 Drawing Sheets

SELF-POWERED BRUSH CUTTER

FIELD OF THE INVENTION

The present invention relates to brush cutters. More specifically, the present invention is concerned with a self-powered brush cutter provided with a cutter head mounted to the end of an articulated boom.

BACKGROUND OF THE INVENTION

Brush cutters are well known in the art and may usually be divided into two different classes: manually handled brush cutters and self-powered brush cutters.

Manually handled brush cutters, whether they are powered by the user, by an electric motor or by an internal combustion engine are conventionally used for brush cutting small areas.

On the other hand, self-powered brush cutters are usually larger and used in large areas.

For example, U.S. Pat. No. 4,899,522 issued to Serge Munger on Feb. 13, 1990 and entitled "Hydraulic powered arm of balance cutter device", illustrates a cutter device mounted to the articulated boom of a conventional earth moving machine to thereby yield a self-powered brush cutter.

Munger's self-powered brush cutter has many drawbacks, such as, for example:

- the earth moving machine is relatively large and heavy, thereby restricting the use of the brush cutter to large and open spaces;
- the use of longs endless tracks makes it difficult to keep an even distance between the brush cutter head and the ground when the earth moving machine moves on uneven ground;
- the use of a conventional articulated boom decreases the user's field of view in the vicinity of the cutter head;
- the relatively large opening in the blade guards allow cut brush wood to become wrapped around the shaft of the motor, thereby requiring regular cleaning of the cutter head, which reduces efficiency;
- the front blade guard is fixedly mounted to the cutter head, preventing cutting action of the front of the blade during forward movement; and
- the underside of the blade guards are convex, thereby presenting a larger front area which requires more power to move forward.

OBJECTS OF THE INVENTION

An object of the present invention is therefore to provide an improved self-powered brush cutter.

SUMMARY OF THE INVENTION

More specifically, in accordance with the present invention, there is provided a self-powered brush cutter comprising:

a carrier including:
  a first frame assembly having first and second opposite sides, a front end and a rear end;
  a second frame assembly provided with a front end and a ground engaging assembly;
  a joint element connecting the front end of the second frame assembly to the rear end of the first frame assembly;
  first and second tandem arms so respectively mounted to the first and second opposite sides of the first frame assembly as to pivot about a common pivot axis; each first and second tandem arms including two ground engaging elements;
  a power unit mounted to one of the first and second frame assembly; the power unit powering the ground engaging elements;
  an articulated boom assembly having a proximate end and a distal end; the proximate end being mounted to the front end of the first frame assembly;
  a cutter head pivotally mounted to the distal end of the boom.

According to a second aspect of the present invention, there is provided an articulated boom assembly for a brush cutter comprising a frame; the articulated boom assembly including:

a base element so mounted to the frame as to pivot about a first pivot axis; the base element including a first pivot pin defining a second pivot axis generally perpendicular to the first pivot axis;
a first actuator mounted between the frame and the base element to selectively pivot the base element about the first pivot axis;
a primary arm having a proximate end so mounted to the first pivot pin of the base element as to pivot about the second pivot axis; the primary arm also having a distal end provided with a second pivot pin defining a third pivot axis generally parallel to the second pivot axis; the primary arm being generally tubular;
a second actuator mounted between the base element and the primary arm to selectively pivot the primary arm about the second pivot axis;
a secondary arm having a proximate end so mounted to second pivot pin of the distal end of the primary arm as to pivot about the third pivot axis; the secondary arm also having a distal end; the second arm being generally tubular;
a third actuator mounted between the primary arm and the secondary arm to selectively pivot the secondary arm about the third pivot axis;
a brush cutter head mounting element so mounted to the distal end of the secondary arm as to pivot about a fourth pivot axis;
an angular adjustment mechanism mounted between the base element and the brush cutter head mounting element both to adjust the pivot angle of the brush cutter head mounting element and to maintain this pivot angle; the angular adjustment mechanism including:
  a first gear mounted to the first pivot pin;
  a second gear mounted to the second pivot pin;
  a first chain loop cooperatively mounted to the first and second gears and enclosed in the primary arm;
  a third gear mounted to the second pivot pin;
  a fourth gear mounted to the brush cutter head mounting element;
  a second chain loop cooperatively mounted to the third and fourth gears and enclosed in the secondary arm;
  fourth actuator mounted between the base element and the first pivot pin to adjust the angular position of the first pivot pin about the second pivot axis;

whereby a) the angular position of the brush cutter head mounting element may be adjusted via the adjustment of the first pivot pin via the fourth actuator; b) the angular position of the brush cutter head mounting element is maintained generally constant during the movement of the primary and secondary arms about respective second and third pivot axis.

According to a third aspect of the present invention, there is provided a brush cutter head attachment comprising:

a longitudinal frame;

a rotary actuator having a body mounted to the longitudinal frame and a transversal driving shaft;

a relatively thin brush cutter blade mounted to the driving shaft; the relatively cutter blade having a generally circular central portion and at least four peripheral teeth integral with the central portion;

at least two generally flat lateral blade guards so mounted to the longitudinal frame as to exceed the cutter blade; each the at least two blade guards having a brush cutter blade opening including:

a relatively narrow central portion configured and sized to allow the central portion of the cutter blade therethrough;

two relatively wide opposite end portions configured and sized to allow the peripheral teeth of the cutter blade therethrough;

whereby, the relatively wide opposite end portions of the brush cutter blade opening safely allow the peripheral teeth therethrough even when accidental deformation of one of the at least four teeth occurs.

Other objects, advantages and features of the present invention will become more apparent upon reading of the following non restrictive description of preferred embodiments thereof, given by way of example only with reference to the accompanying drawings.

DESCRIPTION OF THE PREFERRED EMBODIMENT

Figure 1:
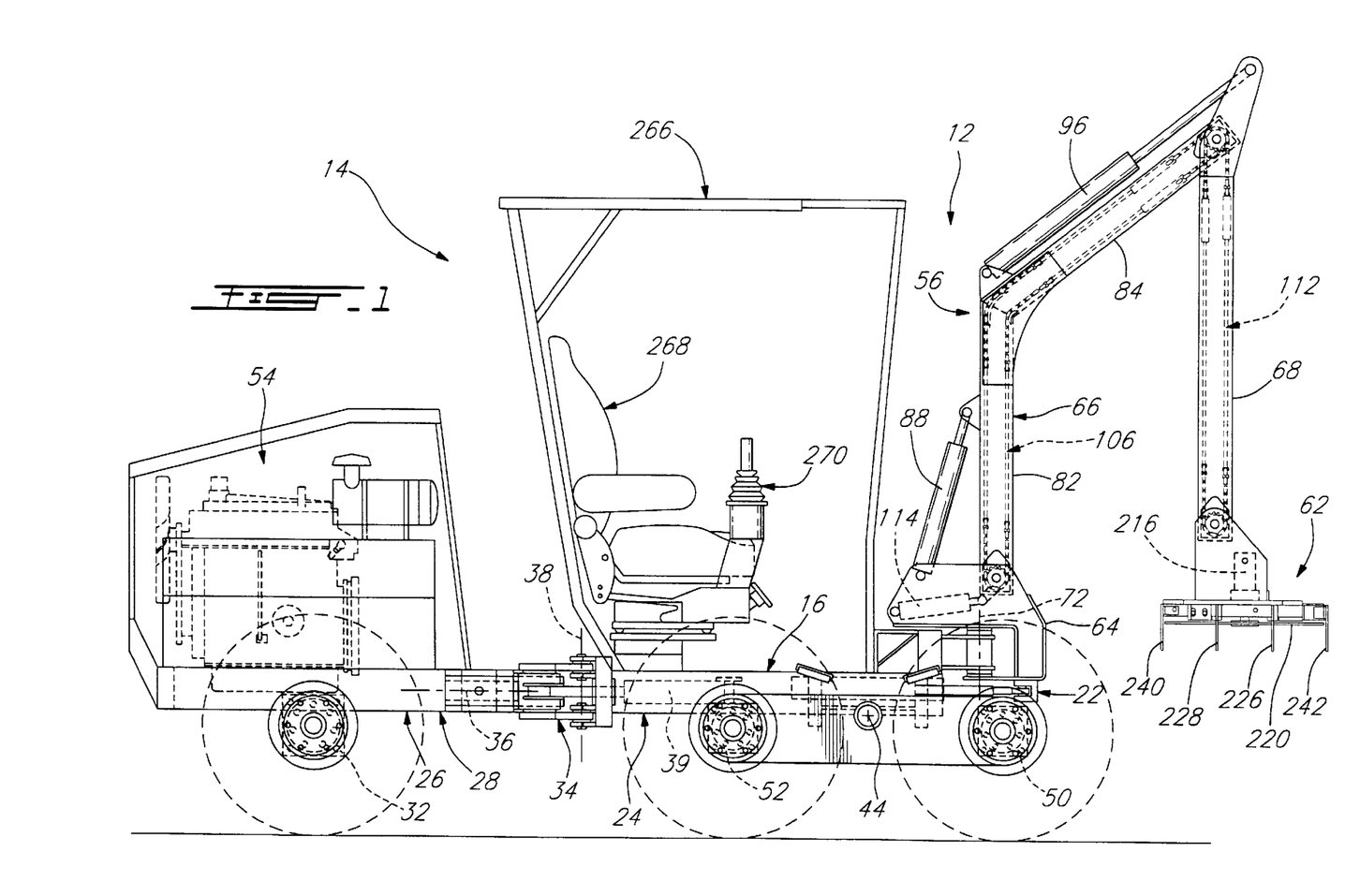
FIG. 1 is a side elevational view of a self-powered brush cutter according to an embodiment of the present invention.
Figure 2:
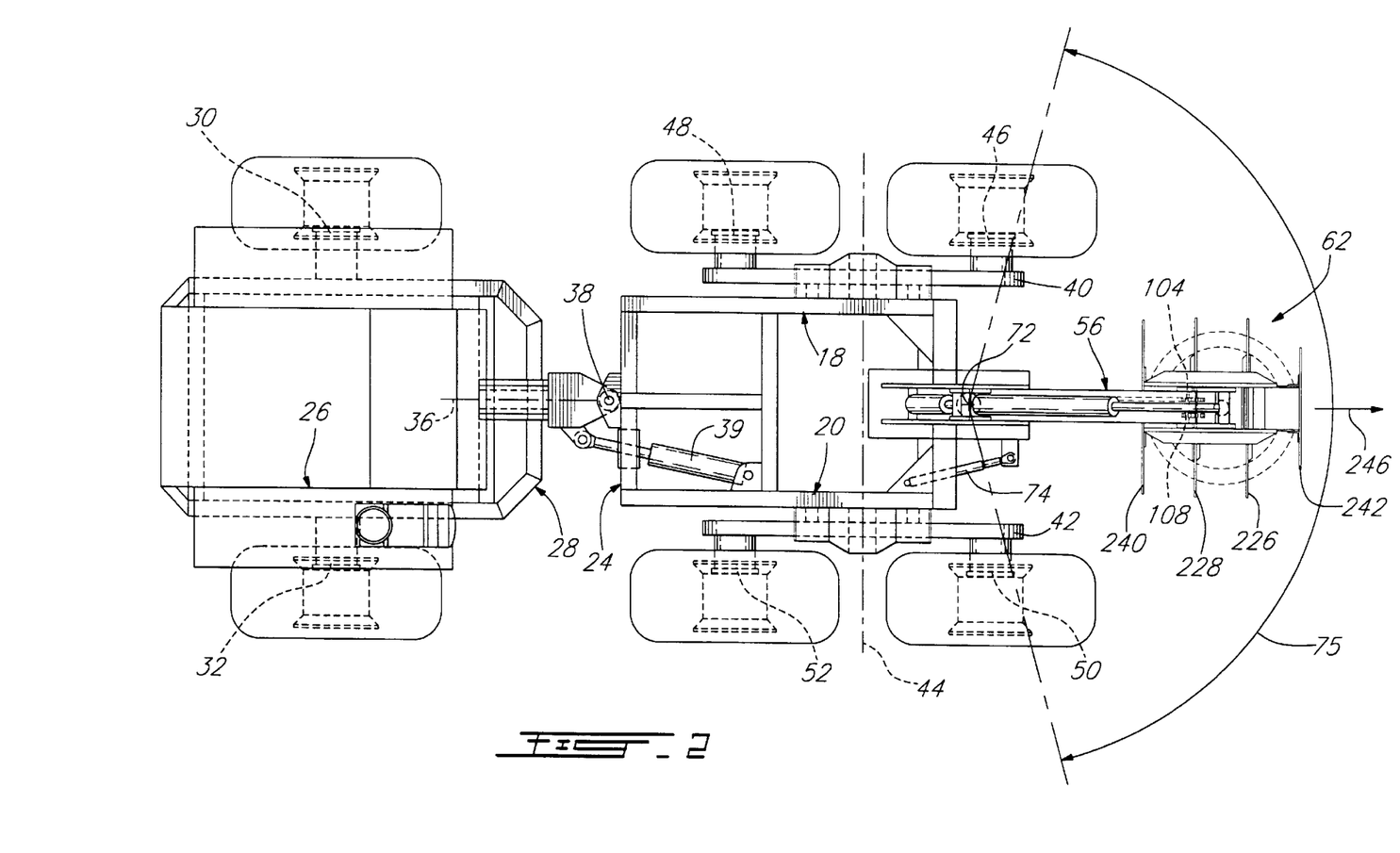
FIG. 2 is a top plan view of the self-powered brush cutter of FIG. 1.
Figure 3:
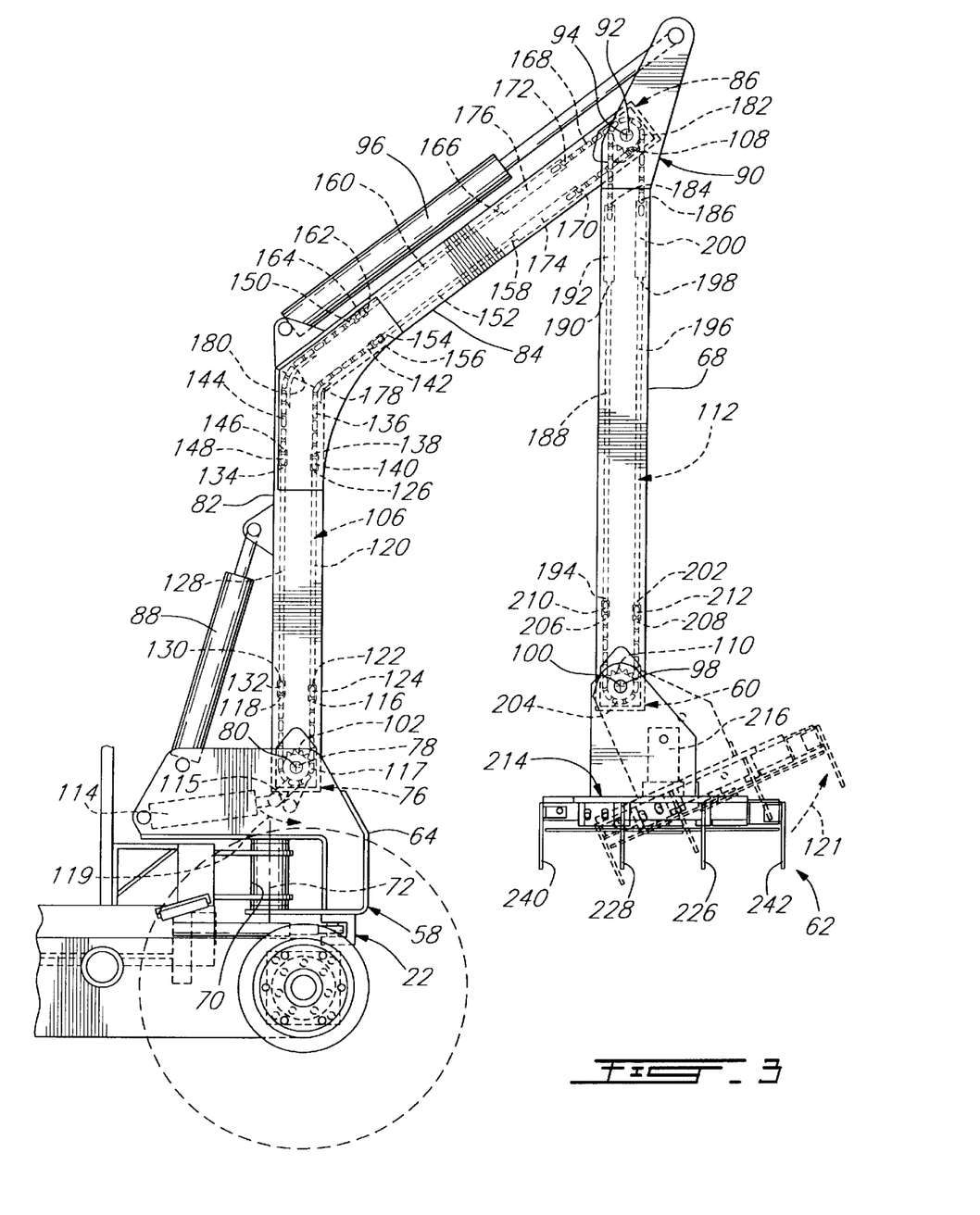
FIG. 3 is a side elevational view of the articulated boom of the self-powered brush cutter of FIG. 1.

Turning now to FIGS. 1 to 3 of the appended drawings, a self-powered brush cutter 12 according to an embodiment of the present invention will be described.

The self-powered brush cutter 12 comprises a carrier 14 including a first frame assembly 16 having first and second opposite sides 18 and 20, a front end 22 and a rear end 24, a second frame assembly 26 provided with a front end 28 and a ground engaging assembly in the form of first and second independent hydraulic motor-wheels 30 and 32.

The carrier 14 also includes a joint element 34 interconnecting the front end 28 of the second frame assembly 26 to the rear end 24 of the first frame assembly 16. The joint element 34 allows the first frame assembly 16 to pivot with respect to the second frame assembly 26 along two axes 36 and 38. A hydraulic cylinder 39 is provided to pivot the second frame assembly 26 about axis 38 to therefore steer the self-powered brush cutter 12.

The first frame assembly 16 also includes first and second tandem arms 40 and 42 so respectively mounted to the first and second opposite sides of the first frame assembly 16 as to pivot about a common pivot axis 44. The first tandem arm 40 includes two ground engaging elements in the form of hydraulic motor-wheels 46, 48 while the second tandem arm 42 includes two hydraulic motor-wheels 50, 52.

A power unit 54, including, for example, an internal combustion engine, an hydraulic fluid reservoir (not shown) and an adequate hydraulic pump (not shown), is mounted to the second frame assembly 26.

The self-powered brush cutter 12 also includes an articulated boom assembly 56 having a proximate end 58 mounted to the front end 22 of the first frame assembly 16 and a distal end 60 to which a brush cutter head attachment 62 is mounted.

The articulated boom assembly 56 generally includes a base element 64, a primary arm 66 and a secondary arm 68.

The base element 64 is pivotally mounted to the front end 22 of the first frame assembly 16 via a pivot connector 70. The base element 64 therefore pivots about a first pivot axis 72. A first actuator 74 is mounted between the first frame assembly 16 and the base element 64 to selectively pivot the base element 64 about the first pivot axis 72. As can be seen from FIG. 2, the articulated boom 56 may pivot about the pivot axis 72 of an angle of about 150° (see arrow 75).

Returning to FIG. 3, the primary arm 66 has a proximate end 76 pivotally mounted to the base 64 via a first pivot pin 78 defining a second pivot axis 80 generally perpendicular to the first pivot axis 72. The primary arm therefore pivots about the second pivot axis 80. The primary arm 66 is hollow and defines a straight portion 82 and an angled portion 84. The arm 66 also has a distal end 86 to which the secondary arm 68 is mounted as will be described hereinafter.

A second actuator, in the form of a hydraulic cylinder 88, is mounted between the base element 64 and the straight portion 83 of the primary arm 66 to selectively pivot the primary arm 66 about the second pivot axis 80.

The secondary arm 68 has a proximate end 90 pivotally mounted to the primary arm 66 via a second pivot pin 92 defining a third pivot axis 94 generally parallel to the second pivot axis 80. The secondary arm 68 therefore pivots about the third pivot axis 94. The secondary arm 68 is hollow.

A third actuator, in the form of a hydraulic cylinder 96, is mounted between the primary arm 66 and the secondary arm 68 to selectively pivot the secondary arm 68 about the third pivot axis 94.

The secondary arm 68 also includes a brush cutter head mounting element, in the form of a pivot pin 98, so mounted to the distal end 60 of the secondary arm 68 as to pivot about a fourth pivot axis 100.

As can be better seen from FIG. 3 of the appended drawings, the articulated boom 56 also includes an angular adjustment mechanism mounted between the base element 64 and the brush cutter head mounting element 98 both to adjust the pivot angle of the brush cutter head mounting element 98 and to maintain this pivot angle.

The angular adjustment mechanism includes a first gear 102 mounted to the first pivot pin 78, a second gear 104 mounted to the second pivot pin 92, a first chain loop 106 cooperatively mounted to the first and second gears and enclosed in the hollow primary arm 66, a third gear 108 mounted to the second pivot pin 92, a fourth gear 110 mounted to the brush cutter head mounting element 98, a second chain loop 112 cooperatively mounted to the third and fourth gears 108 and 110 and enclosed in the hollow secondary arm 68, and a fourth actuator, in the form of hydraulic cylinder 114, mounted between the base element 64 and the first pivot pin 78, via an eccentric element 115, to adjust the angular position of the first pivot pin 78 about the second pivot axis 80.

As will be apparent to one skilled in the art, the angular position of the brush cutter head mounting element 98 may be adjusted by the angular adjustment of the first pivot pin 78 via actuation of the hydraulic cylinder 114 since the pivot pin 78 is interconnected to the brush cutter head mounting element 98 through the chain loops 106 and 112 (see arrows 119 and 121 in FIG. 3). Similarly, the absolute angular position of the brush cutter head mounting element 98 is maintained generally constant during the movement of the primary and secondary arms 66, 68 about respective second and third pivot axis 80, 92. The chain loops 106 and 112 therefore force the brush cutter head element 98 to pivot during the movement of the arms 66 and 68 to maintain the angular position of the brush cutter head element 98 with respect to the ground.

Figure 9:
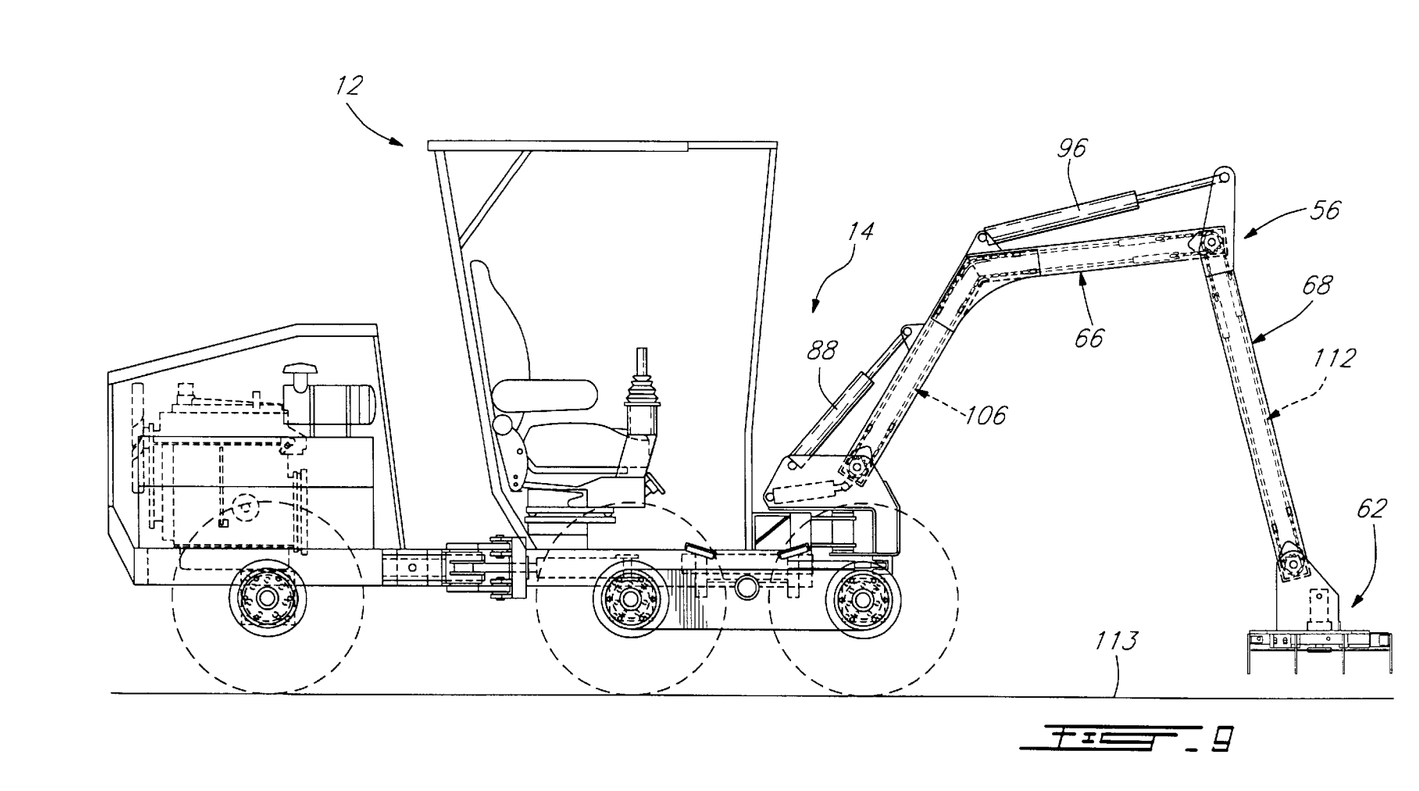
FIG. 9 is a side elevational view of the self-powered brush cutter of FIG. 1 where the articulated boom is relatively close to the self-powered brush cutter and where the cutter head attachment is generally level with the ground.
Figure 10:
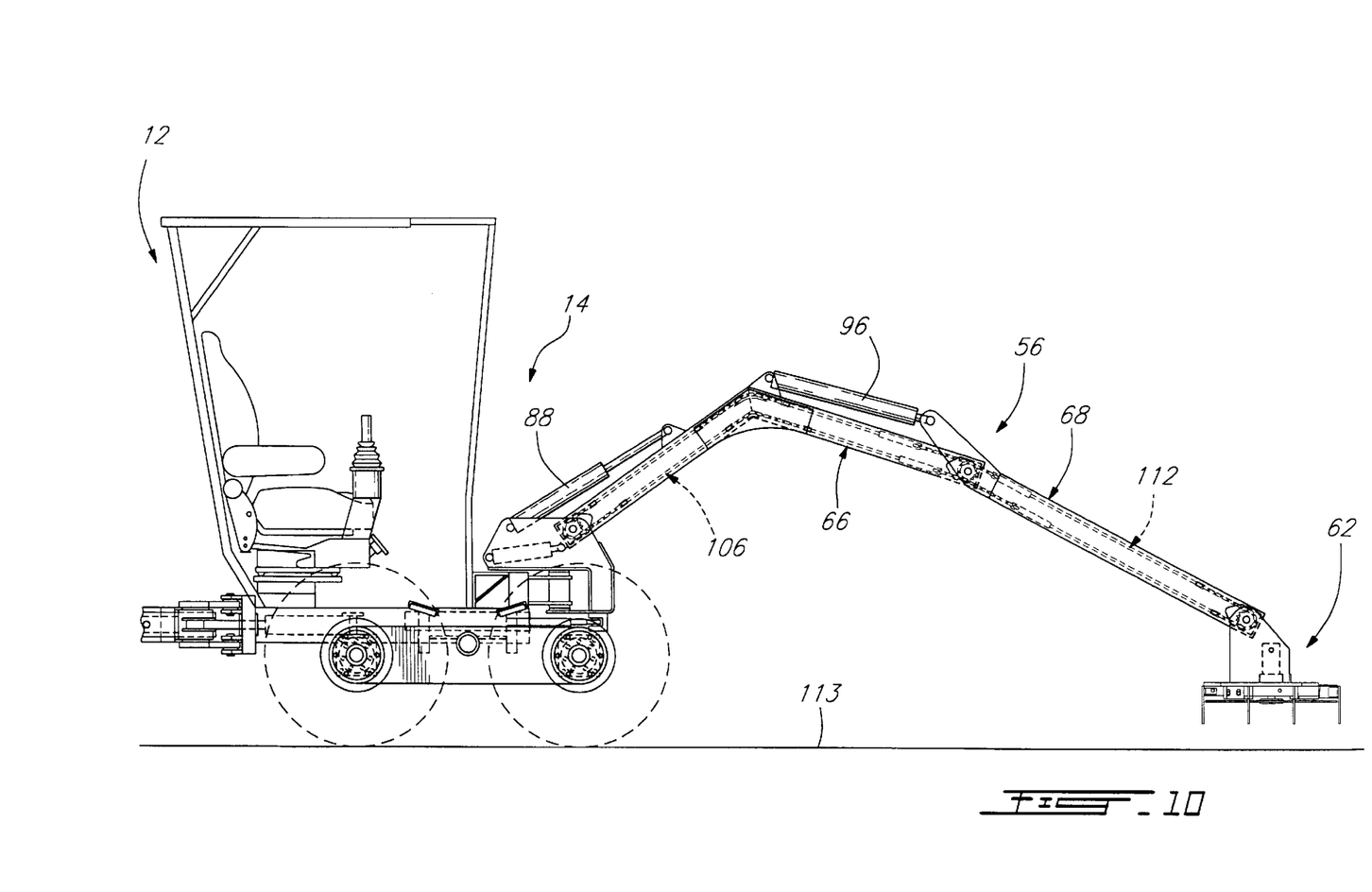
FIG. 10 is a side elevational view of the self-powered brush cutter of FIG. 1 where the articulated boom is relatively far away from the self-powered brush cutter and where the cutter head attachment is generally level with the ground.

Turning briefly to FIGS. 9 and 10 of the appended drawings, this feature of the articulated boom is illustrated. Indeed, in FIG. 9, the articulated boom 56 is so positioned that the cutter head 62 is relatively close to the carrier 14 while it is also close and parallel to the ground 113. Of course, the angle of the cutter head attachment 62 may be modified as described hereinabove.

As will be apparent to one skilled in the art, to move the cutter head 62 from its position in FIG. 9 to its position in FIG. 10, only the hydraulic cylinders 88 and 96 have to be adequately actuated. Indeed, further adjustment of the angle of the cutter head 62, via the cylinder 114, is no required since the angle is maintained by the movements of the chain loops 106 and 112.

The first chain loop 106 includes a first chain portion 117 cooperatively mounted to the first gear 102 and provided with first and second chain ends 116, 118, a first rigid rod 120 having a proximate end 122 mounted to the first chain end 116 via a connector 124 and a distal end 126; a second rigid rod 128 having a proximate end 130 mounted to the second chain end 118 via a connector 132 and a distal end 134. The first chain loop 106 also includes a second chain portion 136 having a proximate end 138 mounted to the distal end 126 of the first rigid rod 120 via a connector 140, and a distal end 142, a third chain portion 144 having a proximate end 146 mounted to the distal end 134 of the second rigid rod 128 via a connector 148 and a distal end 150, a third rigid rod 152 having a proximate end 154 mounted to the distal end 142 of the second chain portion 136 via a connector 156, and a distal end 158, a fourth rigid rod 160 having a proximate end 162 mounted to the distal end 150 of the third chain portion 144 via a connector 164 and a distal end 166. Finally, the first chain loop 106 includes a fourth chain portion 168 cooperatively mounted to the second gear 104 and having first and second chain ends 170, 172 respectively mounted to the distal ends 158, 166 of the third and fourth rigid rods 152, 160 via respective chain tensioning devices 174, 176.

As will be apparent to one skilled in the art, the second and third chain portions 136, 144 are positioned near the junction between the straight portion 82 and the angled portion 84 of the primary arm 66. Furthermore, the primary arm 66 also includes first and second internal chain guides 178, 180 respectively configured and sized to guide the second and third chain portions 136, 144.

The second chain loop 112 includes a first chain portion 182 cooperatively mounted to the third gear 108 and provided with first and second chain ends 184 and 186, a first rigid rod 188 having a proximate end 190 mounted to the first chain end 184 via a chain tensioning device 192 and a distal end 194, a second rigid rod 196 having a proximate end 198 mounted to the second chain end 186 via a chain tensioning device 200 and a distal end 202, and a second chain portion 204 cooperatively mounted to the fourth gear 110 and having first and second chain ends 206, 208 respectively mounted to the distal ends 194, 202 of the first and second rigid rods 188, 196 via respective connectors 210, 212.

Turning now to FIGS. 3 to 8 of the appended drawings, the brush cutter head attachment 62 will be described in greater details.

Figure 6:
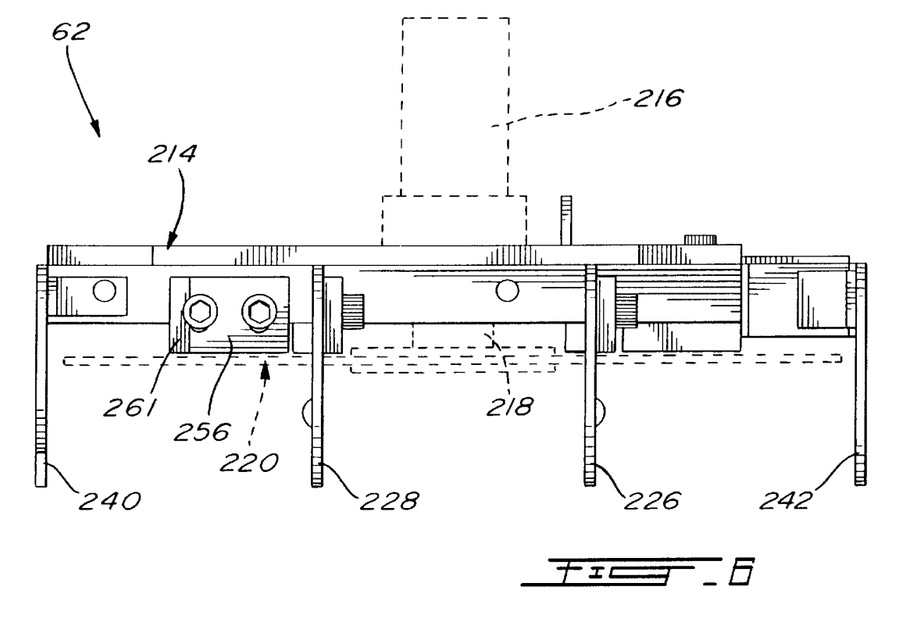
FIG. 6 is a side elevational view of the cutter head of FIG. 4.

The brush cutter head attachment 62 includes a longitudinal frame 214, a rotary actuator, in the form of a hydraulic motor 216, having a body mounted to the longitudinal frame 214 and a transversal driving shaft 218 (see FIG. 6). A relatively thin brush cutter blade 220 is mounted to the driving shaft 218 and has a generally circular central portion 222 and four peripheral teeth 224 integral with the central portion 222. It is to be noted that the number of teeth 224 is not critical and could be modified at will by one skilled in the art.

Figure 8:
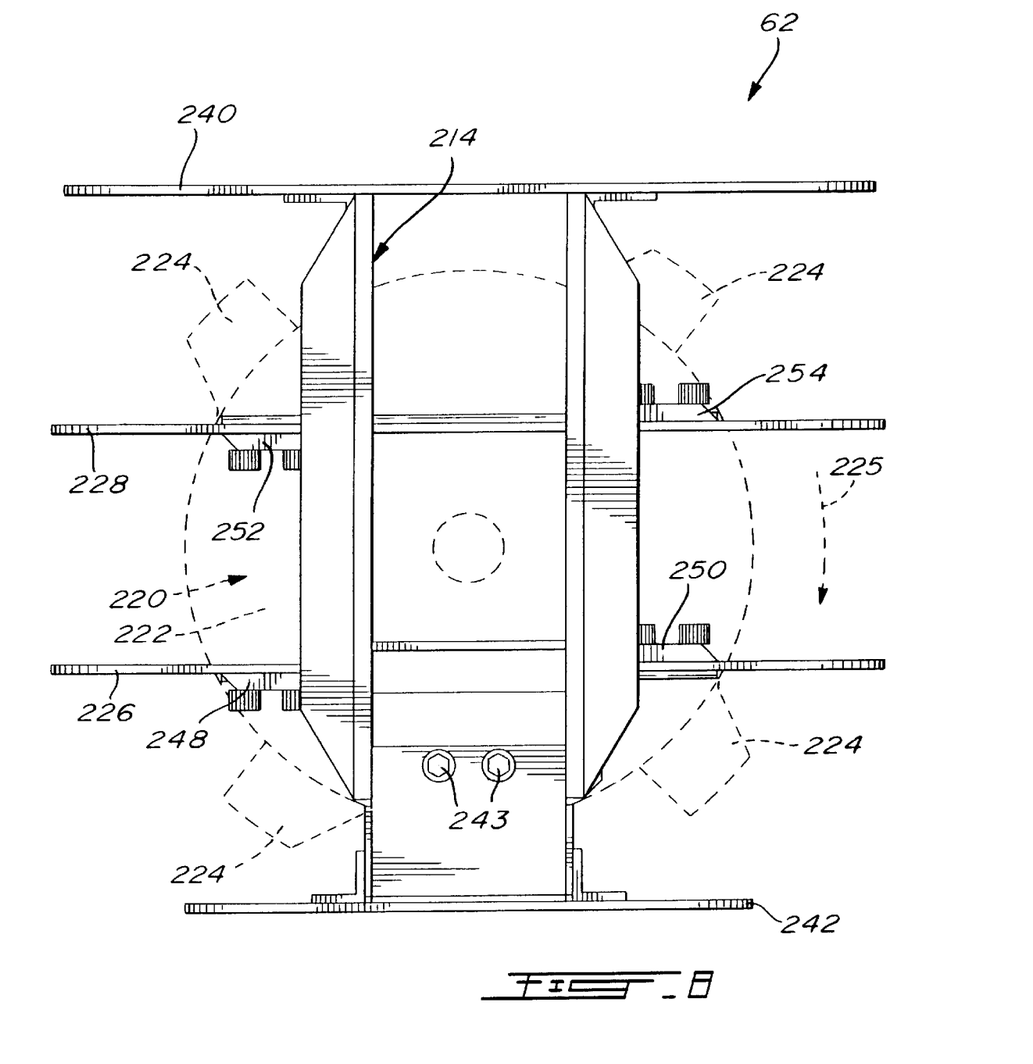
FIG. 8 is a top plan view of the cutter head of FIG. 4.

As can be better seen from FIG. 8, the blade 220 rotates clockwise (see arrow 225) when the hydraulic motor 216 is actuated.

Figure 4:
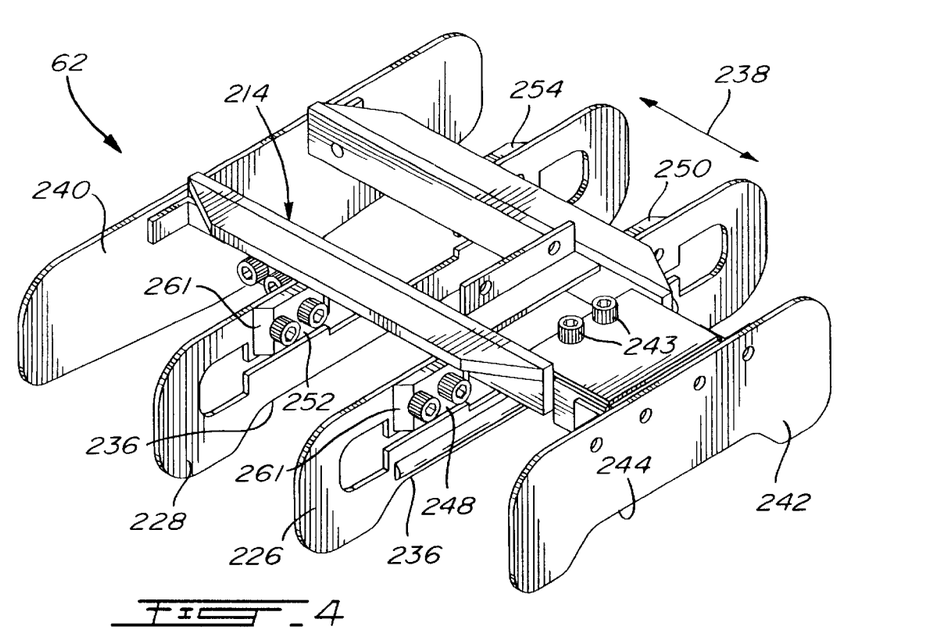
FIG. 4 is a perspective view of the cutter head of the self-powered brush cutter of FIG. 1.
Figure 5:
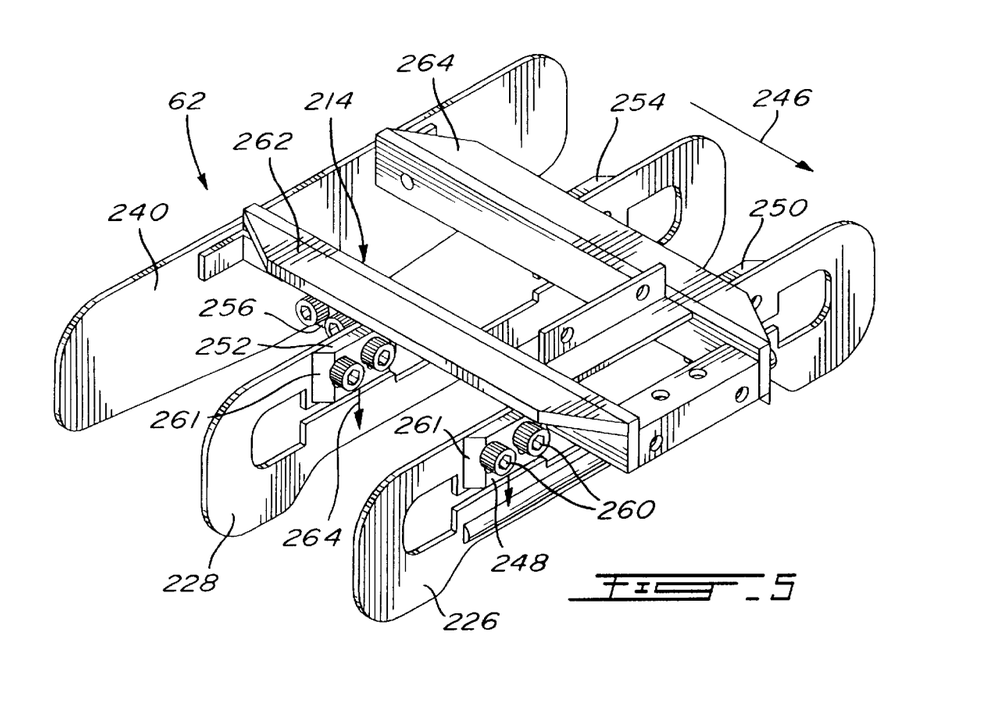
FIG. 5 is a perspective view similar to FIG. 4, where the front guard of the cutter head has been removed.

The brush cutter head attachment 62 also includes two generally flat lateral blade guards 226, 228 so mounted to the longitudinal frame 214 as to exceed the cutter blade 220. The blade guards 226, 228 are generally parallel to one another.

Figure 7:
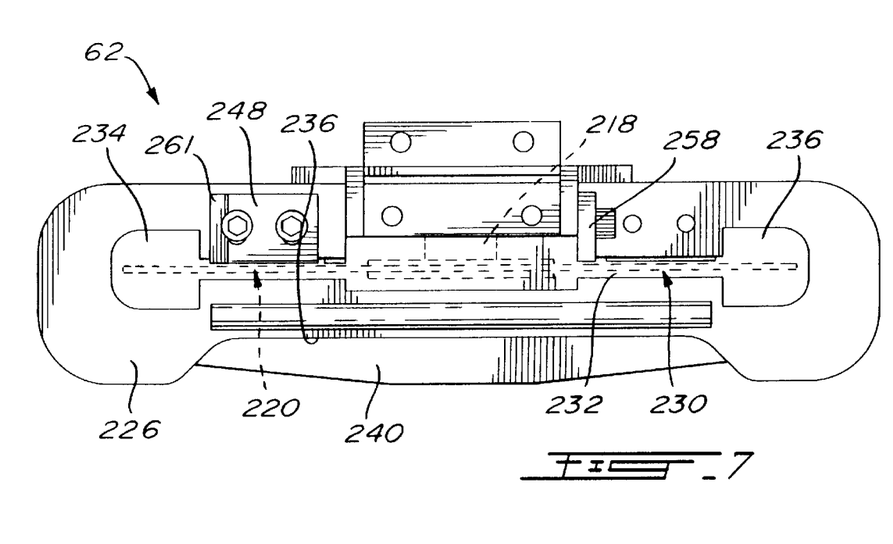
FIG. 7 is a front elevational view of the cutter head of FIG. 5.

As can be better seen from FIG. 7 of the appended drawings, a brush cutter blade opening 230 is provided in each blade guard 226 and 228. Since they are identical, only the brush cutter blade opening 230 of the blade guard 226 will be described hereinafter.

The brush cutter blade opening 230 includes a relatively narrow central portion 232 configured and sized to allow the central portion 222 of the cutter blade 220 therethrough and two relatively wide opposite end portions 234, 236 configured and sized to allow the peripheral teeth 224 of the cutter blade therethrough.

As will be easily understood by one skilled in the art, the relatively wide opposite end portions 234, 236 of the brush cutter blade opening 230 safely allow the peripheral teeth therethrough even when accidental deformation of one of the four teeth 224 occurs. Indeed, should the blade 220 hit a solid obstacle, such as, for example, a rock, chances are that one or more teeth 224 will be severely deformed. If the aperture 230 was entirely as narrow as portion 232, the deformed tooth would forcefully contact the blade guard which could cause injury to the user or the mechanical failure of the brush cutter head attachment 62.

The blade guards 226 and 228 are provided with recessed undersurfaces 236 to thereby facilitate the movements of the cutter head 62 in the directions of the double arrow 238 (see FIG. 4), specially when the cutter head 62 is in contact with the ground since it presents less contact surface.

The brush cutter head attachment 62 also includes a rear guard 240 so mounted to the longitudinal frame 214 as to be generally parallel to the blade guards 226 and 228. The rear guard 240 advantageously protects the driver on the self-powered brush cutter 12 from flying debris.

The brush cutter head attachment 62 further includes a removable front guard 242 so mounted to the longitudinal frame 214 as to be generally parallel to the blade guards 226 and 228. The front guard 242 is mounted to the frame 214 via fasteners 243. As can be better seen from FIG. 4, the front guard 242 has a generally recessed undersurface 244.

FIG. 5 illustrates the cutter head attachment 62 where the front guard 242 has been removed. The advantage of providing a detachable front guard 242 is the possibility to cut bushes in the direction of arrow 246 (FIG. 5) when the guard is removed.

To prevent cutter brushes from becoming wrapped around the driving shaft 218 of the hydraulic motor 216, the brush cutter head attachment includes six (6) adjustable scraping elements 248–258. More specifically, two adjustable scraping elements 248 and 250 are mounted to the blade guard 226, two adjustable scraping elements 252 and 254 are mounted to the blade guard 228, and two adjustable scraping elements 256 and 258 are mounted to the frame 214.

Each scraping element 248–260 includes a bevelled surface 261 (FIG. 4) that pushes cut brushes outwardly without trapping them or creating undue friction.

The scraping elements are so adjusted that they leave only a small gap between themselves and the central portion 222 of the cutter blade 220 (see for example, scraping element 248 in FIG. 7). They therefore contact any cut brushes that would adhere to the blade 220 and take them away from the blade. More specifically, each adjustable scraping element 248–258 includes two oblong apertures (not shown) through which fasteners (see for example, socket head cap screws 260 mounted to the scraping element 248) may be inserted before being threaded in apertures of the brush cutter head 62.

Even tough the scraper elements 248–258 are made of a friction reducing material, such as, for example, oil impregnated cast Nylon® they are slowly worn by the cut brushes. When the gap between the scraper elements and the blade becomes inadequate, the fasteners may be loosened and the scraper element may be adjusted (see arrow 264).

The longitudinal frame 214 includes two longitudinal cut brushes pushing elements 262, 264 having a generally inverted L-shape. These pushing elements are so mounted to the longitudinal frame 214 as to outwardly push cut brushed from the brush cutter head attachment 62.

Of course, as will easily be understood by one skilled in the art, the power unit 54 supplies pressurized hydraulic fluid to the hydraulic motor-wheels 30, 32, 46, 48, 50, 52 and 216 and to the hydraulic cylinders 39, 74, 88, 96, 114, via conventional fluid conduits (not shown).

As clearly seen from FIG. 1, the first frame assembly 16 supports a drivers cabin 266 provided with a seat 268 and vehicle's controls, such as, for example, a joystick 270. Of course, the driver has control over the direction and the speed of the self-powered brush cutter 12 and over the movements of the articulated boom 56.

It is to be noted that the hydraulic motor-wheels of the carrier 14 could be replaced by other ground engaging elements such as, for example, endless tracks (not shown). It is also to be noted that the hydraulic motor-wheels 30 and 32 of the second frame 26 could be replaced by tandem arms (not shown) similar to tandem arms 40, 42, including motor-wheels or endless tracks.

The self-powered brush cutter of the present invention has many advantages such as, for example:

the use of hydraulic motors allow very precise slow movements;

since the carrier 14 is steered by the joint element 34, it is possible to drive the self-powered brush cutter using a joystick;

since the self-powered brush cutter is relatively compact and light in weight, it is possible to use it in very tight spaces, on any type of terrain;

the angle adjustment mechanism increases the visibility of the cutter head attachment 62 since no hydraulic cylinders are in the way;

the use of tandem arms on the first frame 16 decreases the effects of bumps on the ground;

the scraper elements effectively prevent cut brushes from becoming wrapped around the shaft of the cutter head;

the deformation of the cutter blade does not inevitably result in the mechanical failure of other elements of the cutter head or lead to drivers injury;

the use of blade guard improve the safety of the cutter head;

the removable front guard allow very selective cutting operations; and the two longitudinal inverted L-shaped cut brushes pushing elements effectively push cut brushes out of the way of the blade.

Although the present invention has been described hereinabove by way of preferred embodiments thereof, it can be modified, without departing from the spirit and nature of the subject invention as defined in the appended claims.

What is claimed is:

1. A self-powered brush cutter comprising:
a carrier including:
a first frame assembly having first and second opposite sides, a front end and a rear end;
a second frame assembly provided with a front end and a ground engaging assembly;
a joint element connecting said front end of said second frame assembly to said rear end of said first frame assembly;
first and second tandem arms so respectively mounted to said first and second opposite sides of said first frame assembly as to pivot about a common pivot axis; each said first and second tandem arms including two ground engaging elements;
a power unit mounted to one of said first and second frame assembly; said power unit powering said ground engaging elements;
an articulated boom assembly having a proximate end and a distal end; said proximate end being mounted to said front end of said first frame assembly; said articulated boom comprising:
a base element so mounted to said front end of said first frame assembly as to pivot about a first pivot axis; said base element including a first pivot pin defining a second pivot axis generally perpendicular to said first pivot axis;

a first actuator mounted between said first frame assembly and said base element to selectively pivot said base element about said first pivot axis;

a primary arm having a proximate end so mounted to said first pivot pin of said base element as to pivot about said second pivot axis; said primary arm also having a distal end provided with a second pivot pin defining a third pivot axis generally parallel to said second pivot axis; said primary arm being generally tubular;

a second actuator mounted between said base element and said primary arm to selectively pivot said primary arm about said second pivot axis;

a secondary arm having a proximate end so mounted to said second pivot pin of said distal end of said primary arm as to pivot about said third pivot axis; said secondary arm also having a distal end; said second arm being generally tubular;

a third actuator mounted between said primary arm and said secondary arm to selectively pivot said secondary arm about said third pivot axis;

a brush cutter head mounting element so mounted to said distal end of said secondary arm as to pivot about a fourth pivot axis;

an angular adjustment mechanism mounted between said base element and said brush cutter head mounting element used to both to adjust the pivot angle of the brush cutter head mounting element and to maintain this pivot angle; said angular adjustment mechanism including:
   a first gear mounted to said first pivot pin;
   a second gear mounted to said second pivot pin;
   a first chain loop cooperatively mounted to said first and second gears and enclosed in said primary arm;
   a third gear mounted to said second pivot pin;
   a fourth gear mounted to said brush cutter head mounting element;
   a second chain loop cooperatively mounted to said third and fourth gears and enclosed in said secondary arm;
   fourth actuator mounted between said base element and said first pivot pin to adjust the angular position of said first pivot pin about said second pivot axis;

a cutter head pivotally mounted to said distal end of said boom whereby a) said angular position of said brush cutter head mounting element may be adjusted via the adjustment of said first pivot pin via said fourth actuator; b) said angular position of said brush cutter head mounting element is maintained generally constant during the movement of the primary and secondary arms about respective second and third pivot axis.

2. A self-powered brush cutter as recited in claim 1, wherein said ground engaging assembly includes third and fourth tandem arms so respectively mounted to opposite sides of said second frame assembly as to pivot about a common pivot axis; each said third and fourth tandem arms including two ground engaging elements.

3. A self-powered brush cutter as recited in claim 1, wherein said power unit is mounted to said second frame assembly and wherein said first frame assembly includes a driver's cabin.

4. A self powered brush cutter as recited in claim 1, wherein said cutter head includes:
   a longitudinal frame mounted to said brush cutter head mounting element;
   a rotary actuator having a body mounted to said longitudinal frame and a transversal driving shaft;
   a relatively thin brush cutter blade mounted to said driving shaft; said relatively thin cutter blade having a generally circular central portion and at least four peripheral teeth integral with said central portion;
   at least two generally flat lateral blade guards so mounted to said longitudinal frame as to exceed said cutter blade; each said at least two blade guards having a brush cutter blade opening including:
      a relatively narrow central portion configured and sized to allow said central portion of said cutter blade therethrough;
      two relatively wide opposite end portions configured and sized
to allow said peripheral teeth of said cutter blade therethrough; whereby, the relatively wide opposite end portions of said brush cutter blade opening safely allow said peripheral teeth therethrough even when accidental deformation of one of said at least four teeth occurs.

5. An articulated boom assembly for a brush cutter comprising a frame; said articulated boom assembly being configured to receive a brush cutter head and including:
   a base element so mounted to the frame as to pivot about a first pivot axis; said base element including a first pivot pin defining a second pivot axis generally perpendicular to said first pivot axis;
   a first actuator mounted between the frame and said base element to selectively pivot said base element about said first pivot axis;
   a primary arm having a proximate end so mounted to said first pivot pin of said base element as to pivot about said second pivot axis; said primary arm also having a distal end provided with a second pivot pin defining a third pivot axis generally parallel to said second pivot axis; said primary arm being generally tubular;
   a second actuator mounted between said base element and said primary arm to selectively pivot said primary arm about said second pivot axis;
   a secondary arm having a proximate end so mounted to said second pivot pin of said distal end of said primary arm as to pivot about said third pivot axis; said secondary arm also having a distal end; said second arm being generally tubular;
   a third actuator mounted between said primary arm and said secondary arm to selectively pivot said secondary arm about said third pivot axis;
   a brush cutter head mounting element so mounted to said distal end of said secondary arm as to pivot about a fourth pivot axis;
   an angular adjustment mechanism mounted between said base element and said brush cutter head mounting element both to adjust the pivot angle of the brush cutter head mounting element and to maintain this pivot angle; said angular adjustment mechanism including:
      a first gear mounted to said first pivot pin;
      a second gear mounted to said second pivot pin;
      a first chain loop cooperatively mounted to said first and second gears and enclosed in said primary arm;
      a third gear mounted to said second pivot pin;
      a fourth gear mounted to said brush cutter head mounting element;
      a second chain loop cooperatively mounted to said third and fourth gears and enclosed in said secondary arm;
      fourth actuator mounted between said base element and said first pivot pin to adjust the angular position of said first pivot pin about said second pivot axis;

whereby a) said angular position of said brush cutter head mounting element may be adjusted via the adjustment of said first pivot pin via said fourth actuator; b) said angular position of said brush cutter head mounting element is maintained generally constant during the movement of the primary and secondary arms about respective second and third pivot axis.

6. An articulated boom as recited in claim 5, wherein said primary arm is generally angled defining a straight portion and an angled portion.

7. An articulated boom as recited in claim 6, wherein said first chain loop includes:
- a first chain portion cooperatively mounted to said first gear and provided with first and second chain ends,
- a first rigid rod having a proximate end mounted to said first chain end and a distal end;
- a second rigid rod having a proximate end mounted to said second chain end and a distal end;
- a second chain portion having a proximate end mounted to said distal end of said first rigid rod, and a distal end;
- a third chain portion having a proximate end mounted to said distal end of said second rigid rod and having a distal end;
- a third rigid rod having a proximate end mounted to said distal end of said second chain portion and a distal end;
- a fourth rigid rod having a proximate end mounted to said distal end of said third chain portion and a distal end;
- a fourth chain portion cooperatively mounted to said second gear, said fourth chain portion having first and second chain ends respectively mounted to said distal ends of said third and fourth rigid rods.

8. An articulated boom as recited in claim 5, wherein said angular adjustment mechanism also includes an eccentric element fixedly mounted to said first gear and wherein said fourth actuator includes a hydraulic cylinder mounted between said base element and said eccentric element.

9. An articulated boom as recited in claim 8, wherein said second and third chain portions are positioned at a junction between said straight portion and said angles portion of said primary arm.

10. An articulated boom as recited in claim 7, wherein said primary arm further includes first and second internal chain guides respectively configured and sized to guide said second and third chain portions.

11. An articulated boom as recited in claim 8, herein said first chain loop further includes at least one chain tensioning device mounted between one of said chain portion and an adjacent rigid rod.

12. An articulated boom as recited in claim 5, wherein said second chain loop includes:
- a first chain portion cooperatively mounted to said third gear and provided with first and second chain ends,
- a first rigid rod having a proximate end mounted to said first chain end and a distal end;
- a second rigid rod having a proximate end mounted to said second chain end and a distal end;
- a second chain portion cooperatively mounted to said fourth gear, said second chain portion having first and second chain ends respectively mounted to said distal ends of said first and second rigid rods.

13. An articulated boom as recited in claim 12, wherein said second chain loop further includes at least one chain tensioning device mounted between one of said first and second chain portions and one of said first and second rigid rods.

14. An articulated boom as recited in claim 5, wherein said first actuator includes a hydraulic cylinder.

15. An articulated boom as recited in claim 5, wherein said second actuator includes a hydraulic cylinder.

16. An articulated boom as recited in claim 5, wherein said third actuator includes a hydraulic cylinder.

17. A brush cutter head attachment comprising:
- a longitudinal frame;
- a rotary actuator having a body mounted to said longitudinal frame and a transversal driving shaft;
- a relatively thin brush cutter blade mounted to said driving shaft; said relatively thin cutter blade having a generally circular central portion and at least four peripheral teeth integral with said central portion;
- at least two generally flat lateral blade guards so mounted to said longitudinal frame as to exceed said cutter blade; each said at least two blade guards having a brush cutter blade opening including:
  - a relatively narrow central portion configured and sized to allow said central portion of said cutter blade therethrough;
  - two relatively wide opposite end portions configured and sized to allow said peripheral teeth of said cutter blade therethrough;
whereby, the relatively wide opposite end portions of said brush cutter blade opening safely allow said peripheral teeth therethrough even when accidental deformation of one of said at least four teeth occurs.

18. A brush cutter head as recited in claim 17, wherein said at least two blade guards are generally parallel.

19. A brush cutter head as recited in claim 18, further comprising a rear guard so mounted to said frame as to be generally parallel to said at least two blade guards.

20. A brush cutter head as recited in claim 18, further comprising a front guard so mounted to said longitudinal frame as to be generally parallel to said at least two blade guards.

21. A brush cutter head as recited in claim 20, wherein said front guard is removably mounted to said longitudinal frame.

22. A brush cutter head as recited in claim 17, wherein each said at least two blade guards include a generally recessed undersurface.

23. A brush cutter head as recited in claim 17, further comprising at least one adjustable scraping element so mounted to one of said at least two blade guards as to scrape cut brushes from said central portion of said cutter blade to thereby prevent brush accumulation about said driving shaft.

24. A brush cutter head as recited in claim 17, further comprising a longitudinal cut brushes pushing element so mounted to said longitudinal frame as to outwardly push cut brushed from said brush cutter head.

* * * * *